Dec. 30, 1958  M. A. MOSESMAN  2,866,750
PRETREATMENT OF COBALT MOLYBDATE-ON-ALUMINA CATALYST
Filed Nov. 5, 1956  2 Sheets-Sheet 1
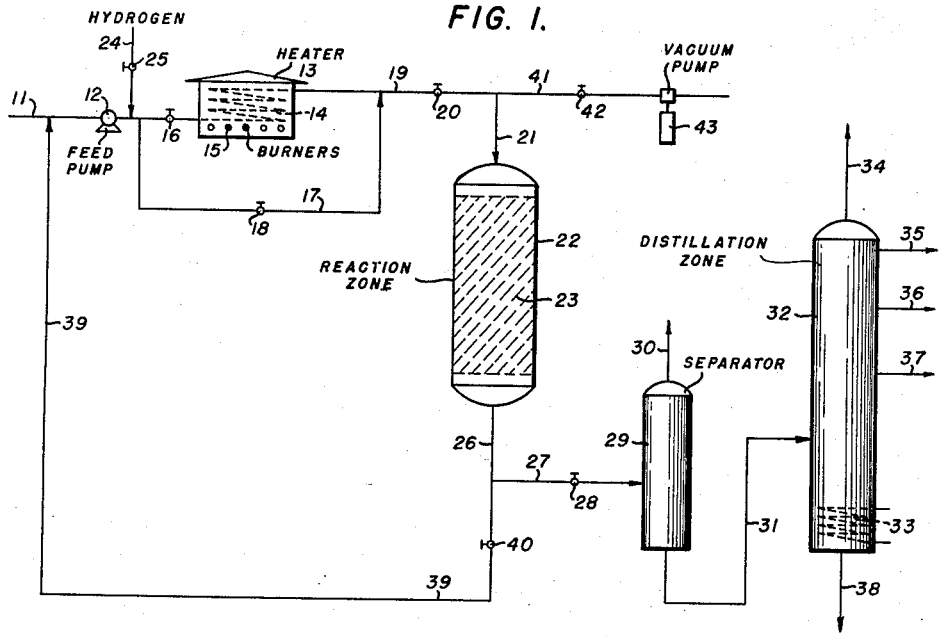
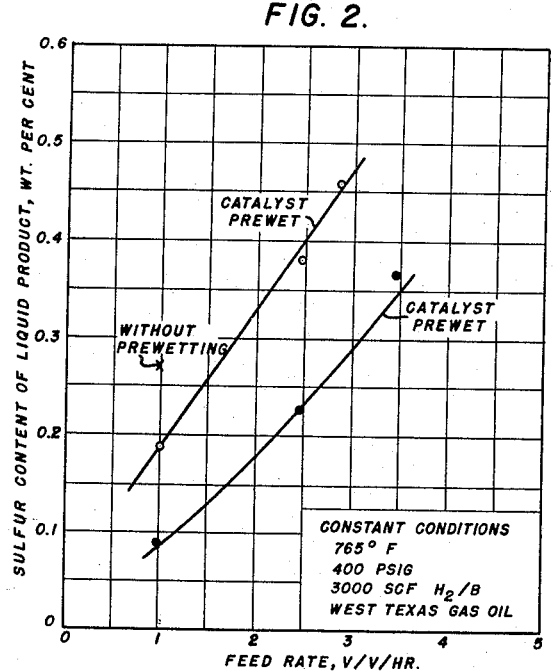
INVENTOR.
Max A. Mosesman,
BY
ATTORNEY.

Dec. 30, 1958  M. A. MOSESMAN  2,866,750
PRETREATMENT OF COBALT MOLYBDATE-ON-ALUMINA CATALYST
Filed Nov. 5, 1956  2 Sheets-Sheet 2

INVENTOR.
Max A. Mosesman,
BY
ATTORNEY.

United States Patent Office 2,866,750
Patented Dec. 30, 1958

2,866,750

PRETREATMENT OF COBALT MOLYBDATE-ON-ALUMINA CATALYST

Max A. Mosesman, Baytown, Tex., assignor, by mesne assignments, to Esso Research and Engineering Company, Elizabeth, N. J., a corporation of Delaware Application November 5, 1956, Serial No. 620,486

6 Claims. (Cl. 208—216)

The present invention is directed to a method for pretreating catalyst. More particularly, the invention is concerned with the pretreating of porous catalysts for employment in conversion operations. In its more specific aspects, the invention is directed to the pretreatment of catalysts employed in mixed phase hydrocarbon conversion operations.

The present invention may be briefly described as involving the pretreatment of catalysts employed in the catalytic conversion of feed hydrocarbons in the presence of hydrogen in which the pressure in a hydrocarbon conversion zone containing the catalyst is reduced to below atmospheric pressure for a sufficient length of time to remove air and other gases from the pores of the catalyst, and to effect some catalyst surface "clean-up" through desorption. The substantially air or gas-free catalyst is then soaked with the feed hydrocarbon at substantially atmospheric pressure and at a temperature below conversion temperature for a sufficient length of time to wet the catalyst with the feed hydrocarbon. Thereafter, the wetted catalyst is then contacted with he feed hydrocarbon under conversion conditions of temperature, pressure, and space velocity such that a mixed vapor-liquid phase exists in contact with the catalyst and such that the hydrocarbon is substantially converted or treated.

The feed stocks for the present invention may suitably include crude petroleum, fractions thereof, asphaltic residua, gas oil, heating oil, kerosene, gasoline, and lubricating oil fractions. A suitable fraction, which may form a feed stock, may boil from about 100° F. through the lubricating oil boiling range.

The conversion operations which may be suitably employed with such feed stocks may include desulfurization, hydrogenation, hydrofining, hydroforming, and the like. The catalyst employed in the present invention is suitably a porous catalyst and preferably is cobalt molybdate preferably on a porous support. By cobalt molybdate it is to be understood that, within the purview of the present invention, cobalt molybdate is a mixture of cobaltous oxide (CoO) and molybdic trioxide (MoO$_3$). The cobaltous oxide and molybdic trioxide may be employed in a preferred ratio of mol per mol as the catalyst but the ratio of cobaltous oxide to molybdic trioxide may range from 0.1:1 to 1.0:1 mol of cobaltous oxide per mol of molybdic trioxide.

The amount of cobalt molybdate on the support may range from about 1.0 to 25.0 weight percent with a preferred amount of approximately 15.0% by weight of the total catalyst.

The supports for the cobalt molybdate may suitably be alumina, zirconia, magnesia, silica, silica-alumina, Filtrol, kieselguhr, Floridan, and the like. Preferred supports are pure alumina hydrates or the gamma aluminas derived therefrom.

Other catalysts which are suitable for operations as described before may be employed and may include nickel promoted supported cobalt molybdate on alumina, molybdena supported on alumina, molybdena supported on activated carbon, and the like.

The air and some of the physically adsorbed gases are preferably removed from the pores of the porous catalyst by subjecting a bed or porous catalyst to reduced pressures for a sufficient length of time in the range between about 10 and about 60 minutes at pressures from about 0.5 to about 10 mm. of mercury.

The substantially air-free catalyst is then soaked with the feed hydrocarbon for a sufficient length of time to wet thoroughly the catalyst with the feed hydrocarbon. A time within the range from about one hour to about 20 hours will cause the catalyst to be wet thoroughly and soaked with the feed hydrocarbon.

The conversion conditions employed with the pretreated catalyst may suitably include a temperature in the range from about 600° to about 850° F., a pressure in the range from about 100 to about 1000 p. s. i. g., hydrogen in an amount in the range from about 1,000 to 10,000 standard cubic feet per barrel of feed and the feed hydro-carbon should contact the catalyst at a space velocity in the range from about 0.25 to about 10 volumes of feed per volume of catalyst per hour.

Ordinarily the temperatures below the conversion temperatures may range from about 300° to 500° F. where the temperature for conversion is in the low part of the conversion temperature range given before. However, somewhat higher non-conversion temperatures may be employed when the conversion temperatures are in the upper portion of the range of temperature conditions.

The conversion operations may be conducted in either an isothermal or an adiabatic reactor and the catalyst is preferably in the form of a fixed bed. The present invention is particularly applicable to operations where the feed stock is present in contact with the catalyst in a mixed phase, i. e., both vapor and liquid hydrocarbons exist at equilibrium or near equilibrium or steady state conditions in contact with the catalyst.

The present invention will be further illustrated by reference to the drawing in which:

Fig. 1 is a flow sheet of a preferred mode; and

Figs. 2 to 5 are charts presenting plots of data illustrating the advantages of the present invention.

Figure 3:
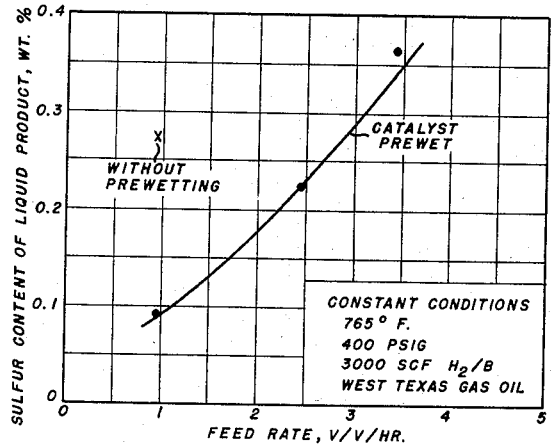

Referring now to Fig. 1 of the drawing, numeral 11 designates a charge line by way of which a feed stock of the nature described is introduced into the system from a source not shown and may be pumped by means of pump 12 through a heater 13 provided with heating coils 14 and supplied with heat by means of fired gas burners 15. Line 11 is provided with a control valve 16 such that all or part of the feed hydrocarbon may be routed around the heater 13 by bypass line 17 controlled by valve 18. The heated or partially heated hydrocarbons issue from coil 14 or from line 17 into line 19 controlled by valve 20 and then pass by way of line 21 into a reaction zone 22 provided with a bed of porous supported catalyst 23.

During conversion operations the heated and partially vaporized hydrocarbon mixture in the presence or absence of hydrogen, which suitably may be added to line 11 by way of line 24 controlled by valve 25, discharges from reaction zone 22 by way of line 26 and then may pass by line 27 controlled by valve 28 into a separation zone 29. In separation zone 29 a separation is made between fixed gases and the liquid hydrocarbon product with the fixed gases being discharged by line 30 for recycling to line 11 in order to employ its hydrogen content in the reaction or for discharge at least in part from the system. The converted or treated products discharge from separator 29 by way of line 31 into a fractional distillation zone 32 which is shown for briefness of description as a single fractional distillation zone but which may include a plurality of fractional distillation towers. Whether a single or plurality of distillation towers are employed, distillation zone 32 will include suitable internal vapor-liquid contacting means such as packing, bell cap trays and the like to insure intimate contact between vapors and liquids. Zone 32 will also include means for inducing reflux, cooling and condensing means, and all auxiliary equipment usually associated with the modern fractional distillation tower. Distillation zone 32 is provided with a heating means such as steam coil 33 for adjustment of temperatures and pressures and with lines 34, 35, 36 and 37 for withdrawal of overhead and side stream products. Zone 32 is also provided with a bottoms line 38 for discharge of heavy fractions and heavy products.

The system is provided with a recycle line 39 controlled by a valve 40 for employment during the pretreating portion of the present invention.

Also connected into line 19 is a line 41 provided with a control valve 42 and with a vacuum pump 43.

Prior to initiating the conversion operations as has been described, the valve 20 in line 19 and the valve 28 in line 27 are closed and valve 42 in line 41 is open. Valve 40 in line 39 is also closed and vacuum pump 43 is operated to reduce the pressure in reaction zone 22 to a pressure in the range from about 0.5 to about 10 mm. of mercury in order to free reaction zone 22 of air and gases or vapors and to remove air and gases or vapors from the pores and surface of the catalyst in the bed of catalyst 23 and zone 22. This operation is continued from about 10 to about 60 minutes and is sufficient to remove the air and vapors or gases from the pores and surface of the catalyst and from the reaction zone 22. Thereafter, valve 42 is closed and the vacuum pump 43 stopped. Feed hydrocarbon is then introduced by way of line 12 and may suitably be preheated where the feed is a gas oil hydrocarbon to a temperature of about 500° F., by passage through the coils 14 of the heater 13 with the burners 15 being fired. This may be accomplished by controlling the burners 15 or by passing part of the feed through by-pass line 17 on opening valve 18. Since valve 20 is open, reaction zone 22 is filled completely with the hydrocarbon heated to a temperature below conversion temperature and such that no air or other gases may come in contact with the catalyst bed 23. After the reaction zone 22 is completely filled with the hydrocarbon, valve 40 may be opened and the hydrocarbon, heated to a temperature below conversion temperature, circulated through the reaction zone 23 for the time indicated to wet and soak completely the catalyst with the hydrocarbon. After the period of time indicated, the valve 40 is closed and by-pass valve 18 may also be closed and hydrogen admitted through line 24 with temperatures and pressures in zone 22 gradually brought up to conversion temperatures. After conversion conditions have obtained in zone 22, valve 28 is opened and the products are discharged into separator 29 and then into zone 32 for separation and recovery thereof.

It will be seen from the foregoing description taken with the drawing that a simple and readily adaptable process has been provided for pretreating conversion catalysts in order to obtain intimate contact between the feed and the conversion catalyst, particularly in operations where mixed phase obtains.

In order to illustrate the invention further, runs were made with a West Texas gas oil where a supported cobalt molybdate on alumina catalyst initially under a pressure of 1 to 10 mm. of mercury was contacted in a static system with the liquid feed at atmospheric temperature for a time of about 15 hours to soak and wet the catalyst thoroughly. Thereafter, flow of the gas oil feed was initiated at the desired flow rate and the temperature was then increased to 300° F. After 10 minutes under these conditions, the desired pressure and hydrogen flow rate were established. The desired operating temperature was then gradually approached and maintained. The results of runs with this West Texas gas oil including operating conditions and inspections of products are presented in the following Table I.

*Table I*

| Run No. | 1 | 2 | 3 | 4 |
|---|---|---|---|---|
| Avg. Reactor Temp., °F | 763 | 763 | 765 | 763 |
| Reactor Pressure, p. s. i. g | 400 | 400 | 400 | 400 |
| Feed Rate, V./V./Hr | 1.03 | 1.01 | 2.48 | 2.83 |
| Feed Rate, W./Hr./W | 0.83 | 0.87 | 2.15 | 2.44 |
| $H_2$ Rate, S. C. F./B | 2,725 | 2,728 | 2,736 | --- |
| Material Balance, Wt. percent | --- | 103.8 | 98.92 | 108.8 |
| Product Inspections: | | | | |
| Sulfur, Wt. percent [1] | 0.270 | 0.188 | 0.37 | 0.47 |
| Liquid, °API | 28.8 | 30.1 | 28.8 | 28.3 |
| Gas Oil Engler— | | | | |
| IBP, °F | 230 | --- | 248 | 358 |
| FBP, percent/°F | 56/700 | 62.5/700 | 50/700 | 50/700 |
| °F. at: | | | | |
| 5% | 386 | 357 | 472 | 480 |
| 10% | 488 | 468 | 535 | 540 |
| 20% | 573 | 556 | 602 | 608 |
| 30% | 619 | 601 | 642 | 616 |
| 40% | 655 | 639 | --- | 676 |
| 50% | 685 | 671 | 700 | 700 |
| 60% | --- | 696 | --- | --- |
| 70% | --- | --- | --- | --- |
| Percent at 430° F | 6.5 | 8 | 4 | 3.5 |
| Percent at 650° F | 39 | 46 | 33 | 33 |
| Percent at 580° F | 22 | 25 | 17 | 16 |

[1] Sulfur content of feed: 2.1%.

Comparing the data in run No. 1 with the data in runs 2, 3 and 4, it will be seen that an appreciable desulfurization of the feed stock has been obtained. In run 1 the catalyst was not pretreated in accordance with the present invention whereas in runs 2, 3 and 4 the catalyst was pretreated. The data from these runs are shown in Fig. 2 which is a plot of data showing the relationship between feed rate and the sulfur content of the liquid product. The comparison without pretreating shows that markedly improved and unexpected results are obtained by pretreating the catalyst in accordance with the present invention. Besides the considerable improvement in desulfurization, the period where lined out conditions were obtained for desulfurization was reduced from about 4 to 8 hours without pretreatment to about 1 to 4 hours where the catalyst is pretreated.

Additional runs were then made which are set out in Table II.

The results in Table II were similarly advantageous. The results of the several runs of Table II are presented in Fig. 3 and are also shown in Fig. 2.

Figure 4:
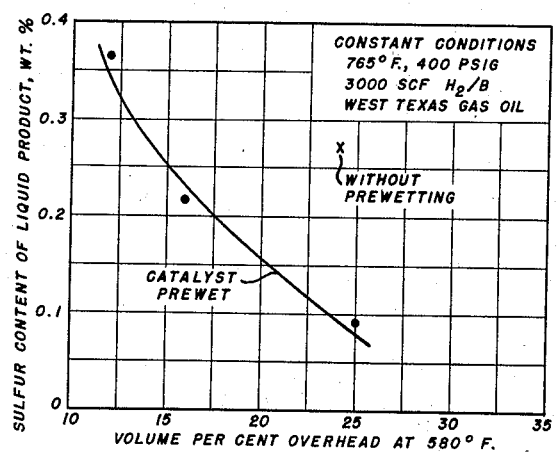
Figure 5:
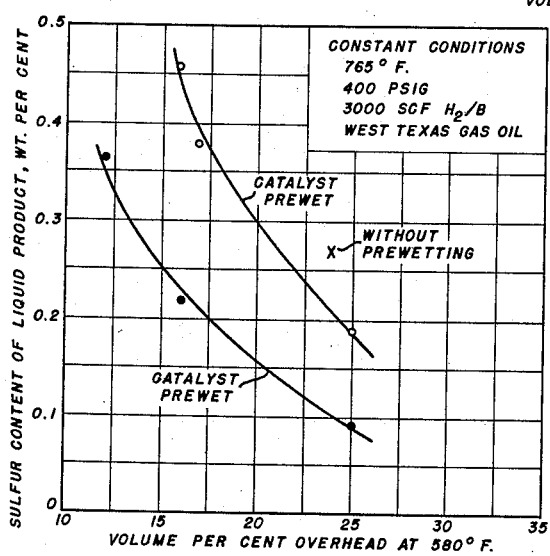

The effect of pretreating in accordance with the present invention is even more noteworthy when the fraction boiling at 580° F. is plotted against the sulfur content. These data taken from the runs shown in Tables I and II are plotted in Figs. 4 and 5.

Not only did the pretreating increase desulfurization but also increased selectivity to desirable products. The present invention is therefore of considerable utility and advantage.

The present invention may also be practiced employing other products. For example, the catalyst bed initially under the reduced pressure as stated before may be allowed to equilibrate with increasing pressure of the feed stock until the partial pressure of the feed during the processing operation is reached. This equilibration may be carried out with or without the appropriate partial pressure of hydrogen. Treatment of this nature will fill the catalyst micropores with liquid feed hydrocarbon and cause soaking and wetting of same.

For example, in conducting such an operation, the catalyst may be subjected to reduced pressure at reaction temperatures in the range given for about 1 hour and thereafter the catalyst temperature may be reduced to a temperature below conversion temperature, for example, 500° F. for gas oil. Vapor from an equilibrated mixture of the feed vapor and liquid hydrocarbon at the non-con- Table II

| Run No | 1 | 2 | 3 | 4 | 5 | 6 | 7 | 8 |
|---|---|---|---|---|---|---|---|---|
| Avg. Reactor Temp., °F | 767 | 763 | 765 | 763 | 760 | 765 | 763 | 763 |
| Reactor Pressure, p. s. i. g. | 400 | 400 | 400 | 400 | 400 | 400 | 400 | 400 |
| Feed Rate, V./V./Hr. | 0.99 | 1.00 | 2.45 | 3.44 | 2.38 | 1.00 | 2.45 | 2.45 |
| Feed Rate, W./Hr./W. | 0.78 | | | | | | | |
| $H_2$ Rate, S. C. F./B. | 2,832 | 2,727 | 2,763 | 2,777 | 2,887 | 2,803 | 2,837 | 2,764 |
| Material Balance, Wt. percent | | 101.6 | 101.7 | 98.07 | 102.87 | 100.4 | 98.00 | 102.68 |
| Product Inspections: | | | | | | | | |
| Sulfur, Wt. percent [1] | | 0.082 | 0.221 | 0.36 | 0.35 | 0.11 | 0.31 | 0.25 |
| Liquid, °API | 29.8 | 30.5 | 28.2 | 27.8 | | | | 28.0 |
| Gas Oil Engler— | | | | | | | | |
| IBP, °F | 200 | 196 | 265 | 310 | | | | 270 |
| FBP, percent/°F | 60/700 | 60/700 | 48/700 | 45/700 | | | | 52/700 |
| °F. at: | | | | | | | | |
| 5% | 370 | 373 | 484 | 520 | | | | 492 |
| 10% | 481 | 475 | 540 | 572 | | | | 539 |
| 20% | 562 | 560 | 604 | 620 | | | | 600 |
| 30% | 609 | 604 | 643 | 656 | | | | 637 |
| 40% | 646 | 639 | 674 | 686 | | | | 669 |
| 50% | 670 | 672 | | | | | | 694 |
| 60% | 700 | 700 | | | | | | |
| 70% | | | | | | | | |
| Percent at 430° F | 7.5 | 7.5 | 3.5 | 3.5 | | | | 2.5 |
| Percent at 650° F | 42 | 46 | 32 | 28 | | | | 35 |
| Percent at 580° F | 24 | 25 | 16 | 12 | | | | |

[1] Sulfur content of feed: 2.1%.

version temperature may then be admitted in small increments of pressure to the catalyst allowing adsorption equilibration to be established after each incremental admission of vapor. This is continued until the pressure in the reactor equals the pressure of an equilibrated feed vapor-liquid mixture. After saturation of the catalyst as has been described, the pressure in the reactor containing the wetted catalyst is then increased to reaction pressure with hydrogen, and feed and hydrogen initiated at the non-reaction temperature to establish flow conditions. Thereafter, the feed and hydrogen mixture is slowly brought up to conversion temperatures.

It is contemplated that the catalyst may be saturated with feed hydrocarbon in the presence of hydrogen or may be saturated with the vapor in a liquid other than that of the feed hydrocarbon, the vapor of the other liquid being completely miscible with the feed hydrocarbon. Saturation of the catalyst may be conducted at temperatures below conversion temperatures with desirable results being obtained.

In the practice of the present invention, it is desirable to remove all vapors or gases, such as air, from the pores of the catalyst and adsorbed vapors or gases from the catalyst surface such that a substantially air or gas-free catalyst is provided and thereafter the catalyst is thoroughly wet with the feed hydrocarbon prior to contacting the catalyst with the feed hydrocarbon at conversion temperatures and pressures.

The present invention is quite useful and is of considerable advantage in that lined-out conditions where high conversions are obtained are reached at shorter times than was possible heretofore and, furthermore, desulfurization of hydrocarbon fractions is increased by pretreating the catalyst in the manner set out herein.

The nature and objects of the present invention having been completely described and illustrated, what I wish to claim as new and useful and to secure by Letters Patent is:

1. A method for pretreating a supported cobalt molybdate on alumina catalyst and employing said catalyst employed in catalytic desulfurization of a sulfur-containing feed hydrocarbon in the presence of hydrogen which comprises reducing the pressure in a desulfurization zone containing said catalyst to a pressure in the range from about 0.5 to about 10 mm. of mercury for a time in the range from about 10 to about 60 minutes to remove gases from the pores of the catalyst and adsorbed material from the catalyst surface, soaking the substantially gas free catalyst with said feed hydrocarbon in the liquid phase and free of hydrogen at substantially atmospheric pressure and at a temperature below desulfurization temperature within the range from about 300° to 500° F. for a sufficient length of time within the range from about 1 to about 20 hours to wet the catalyst with said feed hydrocarbon, and then contacting the wetted catalyst with said feed hydrocarbon at a temperature in the range from about 600° to about 850° F., at a pressure in the range from about 100 to about 1000 p. s. i. g. in the presence of about 1,000 to about 10,000 standard cubic feet of hydrogen per barrel of feed and at a space velocity in the range from about 0.25 to about 10 volumes of feed per volume of catalyst per hour.

2. A method in accordance with claim 1 in which the feed hydrocarbon is a gas oil.

3. A method in accordance with claim 1 in which the feed hydrocarbon is a lubricating oil fraction.

4. A method in accordance with claim 1 in which the feed hydrocarbon is a kerosene fraction.

5. A method in accordance with claim 1 in which the feed hydrocarbon boils in the range from about 100° F. through the lubricating oil boiling range.

6. A method in accordance with claim 1 in which the feed hydrocarbon is an asphaltic residue.

References Cited in the file of this patent

UNITED STATES PATENTS

| | | |
|---|---|---|
| 1,904,133 | Gohr | Apr. 18, 1933 |
| 2,310,244 | Lassiat | Feb. 9, 1943 |
| 2,623,007 | Myers | Dec. 23, 1952 |
| 2,761,817 | Sweetser | Sept. 4, 1956 |